(12) United States Patent  (10) Patent No.: US 9,221,524 B2
Richer De Forges  (45) Date of Patent: Dec. 29, 2015

(54) DEFLECTOR FOR MARINE DATA ACQUISITION SYSTEM

(75) Inventor: Hervé Richer De Forges, Massy (FR)

(73) Assignee: CGGVERITAS SERVICES SA, Massy (FR)

( * ) Notice: Subject to any disclaimer, the term of this patent is extended or adjusted under 35 U.S.C. 154(b) by 359 days.

(21) Appl. No.: 13/606,772

(22) Filed: Sep. 7, 2012

(65) Prior Publication Data

US 2013/0239864 A1  Sep. 19, 2013

Related U.S. Application Data

(60) Provisional application No. 61/611,643, filed on Mar. 16, 2012.

(51) Int. Cl.
*B63B 21/66* (2006.01)
*G01V 1/38* (2006.01)

(52) U.S. Cl.
CPC ............... *B63B 21/663* (2013.01); *B63B 21/66* (2013.01); *G01V 1/38* (2013.01); *G01V 1/3817* (2013.01); *G01V 1/3826* (2013.01)

(58) Field of Classification Search
CPC ........ B63B 21/66; B63B 21/663; G01V 1/38; G01V 1/3808; G01V 1/3826; G01V 1/3843; G01V 1/3852; G01V 1/3817
USPC ............... 114/244–246, 253, 254; 367/15–24
See application file for complete search history.

(56) References Cited

U.S. PATENT DOCUMENTS

| | | | | |
|---|---|---|---|---|
| 2,960,960 A * | 11/1960 | Fehlner | ........................ | 114/245 |
| 2,980,052 A | 4/1961 | Fehlner | | |
| 3,137,264 A * | 6/1964 | Brainard, II et al. | .......... | 114/244 |
| D272,259 S * | 1/1984 | Meister | ........................ | D21/810 |
| D273,127 S * | 3/1984 | Meister | ........................ | D21/810 |
| D308,358 S * | 6/1990 | Moore | ........................ | D12/317 |
| 4,991,534 A * | 2/1991 | Warnan et al. | ................. | 114/245 |
| 5,000,110 A | 3/1991 | Moore | | |
| 5,263,430 A | 11/1993 | Monfort | | |
| 5,357,892 A * | 10/1994 | Vatne et al. | .................... | 114/244 |
| 6,820,568 B1 * | 11/2004 | Shattock | ........................ | 114/244 |
| 8,100,078 B2 * | 1/2012 | Storteig et al. | ................. | 114/246 |
| 2005/0279268 A1 * | 12/2005 | Storteig et al. | ................. | 114/274 |
| 2010/0149910 A1 | 6/2010 | Martin | | |
| 2013/0010570 A1 * | 1/2013 | Sudow et al. | .................... | 367/16 |

FOREIGN PATENT DOCUMENTS

GB   2223728 A   4/1990

OTHER PUBLICATIONS

Extended EP Search Report and Search Opinion mailed Jun. 21, 2013 in related EP Application 13159580.3.

* cited by examiner

*Primary Examiner* — Ajay Vasudeva
(74) *Attorney, Agent, or Firm* — Patent Portfolio Builders PLLC (57) ABSTRACT

Deflectors configured to be attached to cables towed behind a vessel for performing a marine survey are provided. A deflector has a wing body including a first part joined to a second part to form a swept-back-wing shape, the first part and the second part being substantially coplanar. A first straight line stretching along at least a portion of a front edge of the first part makes a first angle with a second straight line stretching along at least a portion of a front edge of the second part. A third straight line stretching along at least a portion of a trailing edge of the first part makes a second angle with a fourth straight line stretching along at least a portion of a trailing edge of the second part, the first angle and the second angle being non-zero angles.

19 Claims, 5 Drawing Sheets

Figure 1

(BACKGROUND ART)

Start

S810
Attaching a deflector to a towing cable configured to be towed behind a vessel to carry marine survey instrumentation, the deflector having a wing body including a first part joined to a second part to form a swept-back-wing shape, the first part and the second part being substantially coplanar S820
Deploying the one towing cable behind the vessel according to a predetermined marine data acquisition geometry Stop

DEFLECTOR FOR MARINE DATA ACQUISITION SYSTEM

BACKGROUND

1. Technical Field

Embodiments of the subject matter disclosed herein generally relate to devices and systems used for marine exploration and, more particularly, to deflectors attached to cables that carry seismic instrumentation.

2. Discussion of the Background

Marine data acquisition and processing generate a profile (image) of a geophysical structure under the seafloor. While this profile does not provide an accurate location of oil and gas reservoirs, it suggests, to those trained in the field, the presence or absence of these reservoirs. In order to obtain a high-resolution image of the structure under the seafloor, plural techniques and devices are employed to maintain the data acquisition geometry while scanning the targeted area.

In marine exploration, waves (such as, but not limited to, seismic waves) are directed toward the seabed, and waves reflected back to receivers close to the water surface are used to extract information about the structure and nature of the rock layers underneath the seabed. A vessel usually tows a series of cables connected to a seismic source and/or a streamer that includes the receivers. The vessel tows the cables along a specified path to scan the targeted area. Arranging and maintaining the configuration of these cables (e.g., with minimal drag, the cables remaining at their assigned depth and lateral offset) is desirable. One of the devices employed in order to arrange and maintain the configuration of these cables is a deflector. The deflector is attached to a towing cable and provides a lift force to the cable while towed through the water, to maintain depth and/or lateral separation among the towing cables.

Figure 1:
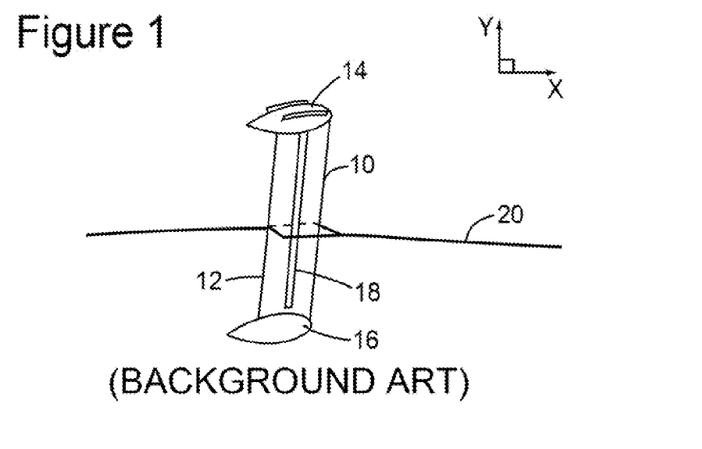
FIG. 1 is a schematic diagram of a conventional deflector.

FIG. 1 illustrates a conventional deflector 10 attached to a towing cable 20. The deflector 10 has a flat, rectangular-shaped body 12 and may have ballast bodies 14 and 16 (also known as pods) at ends of the body 12. A top ballast body 14 is lighter than a bottom ballast body 16 to move the gravity center of the deflector 10 below a buoyancy center thereof. The deflector 10 may also have a slot 18 along the body 12 to increase the stalling angle. The length of the deflector may be around 2.5 m. The deflector 10 is attached to the cable 20 around a middle area of the deflector 10.

Figure 2A:
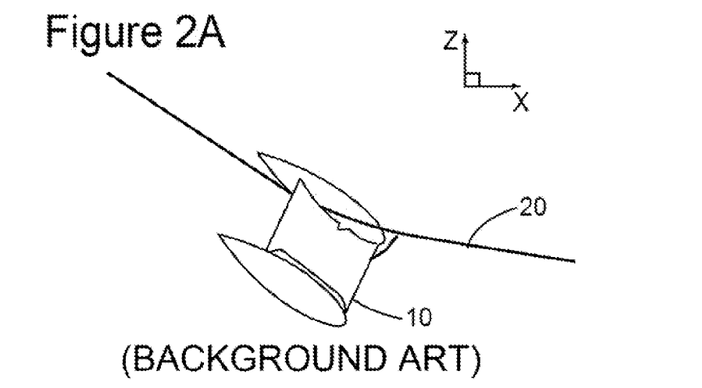
FIGS. 2A and 2B illustrate an unintended roll and yaw of a conventional deflector.
Figure 2B:
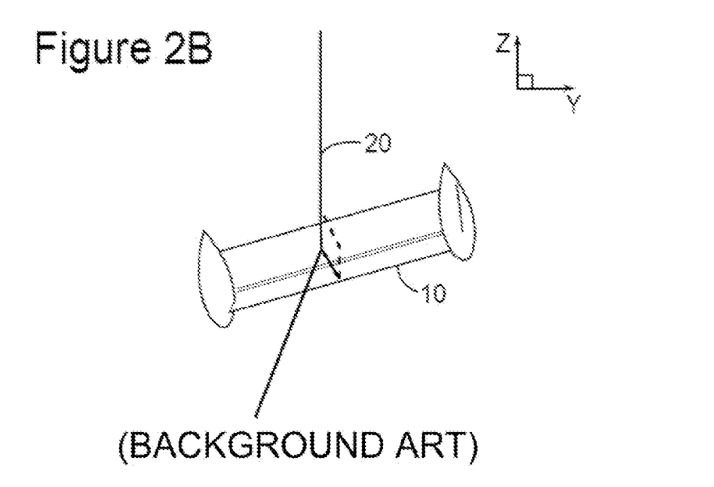

A problem with the conventional deflector is that its angular stability is low, that is, if it rotates (e.g., due to currents) around the towing position, the deflector does not return to the intended position, and, therefore, instead of providing a lift force, drags down the towing cable. FIGS. 2A and 2B illustrate this problem.

Thus, it is desired to produce a deflector that has better angular stability such that if it rotates around the towing position, it develops a returning torque that returns the deflector to the intended position.

SUMMARY

One objective achieved in some of the embodiments described in this application is to provide a deflector with improved angular stability for marine survey (i.e., data acquisition) systems. That is, deflectors are configured to develop a restoring torque opposing deviations (pitch, roll and yaw) of the deflector from an intended position.

According to one exemplary embodiment, there is a deflector configured to be attached to a cable towed by a vessel to carry instrumentation for a marine survey. The deflector has a wing body including a first part joined to a second part to form a swept-back-wing shape, the first part and the second part being substantially coplanar. A first straight line stretching along at least a portion of a front edge of the first part makes a first angle with a second straight line stretching along at least a portion of a front edge of the second part. A third straight line stretching along at least a portion of a trailing edge of the first part makes a second angle with a fourth straight line stretching along at least a portion of a trailing edge of the second part, the first angle and the second angle being non-zero angles.

According to another exemplary embodiment, there is a marine data acquisition system including towing cables configured to be deployed according to a predetermined geometry behind a towing vessel to carry survey instrumentation and at least one deflector attached to one of the towing cables. The at least one deflector has a wing body including a first part joined to a second part to form a swept-back-wing shape, the first part and the second part being substantially coplanar. A first straight line stretching along at least a portion of a front edge of the first part makes a first angle with a second straight line stretching along at least a portion of a front edge of the second part. A third straight line stretching along at least a portion of a trailing edge of the first part makes a second angle with a fourth straight line stretching along at least a portion of a trailing edge of the second part, the first angle and the second angle being non-zero angles.

According to another exemplary embodiment, there is a method of controlling the position of one or more components of a marine data acquisition system. The method includes attaching at least one deflector to at least one towing cable configured to be towed behind a vessel to carry marine survey instrumentation. The deflector has a wing body including a first part joined to a second part to form a swept-back-wing shape, the first part and the second part being substantially coplanar. A first straight line stretching along at least a portion of a front edge of the first part makes a first angle with a second straight line stretching along at least a portion of a front edge of the second part. A third straight line stretching along at least a portion of a trailing edge of the first part makes a second angle with a fourth straight line stretching along at least a portion of a trailing edge of the second part, the first angle and the second angle being non-zero angles. The method further includes deploying the towing cable behind the vessel according to a predetermined marine data acquisition geometry.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a marine survey data acquisition system having one or more cables towed by a vessel. However, the embodiments to be discussed next are not limited to this structure, but they may be applied to other situations in which cables are towed in water at a predetermined depth.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 3:
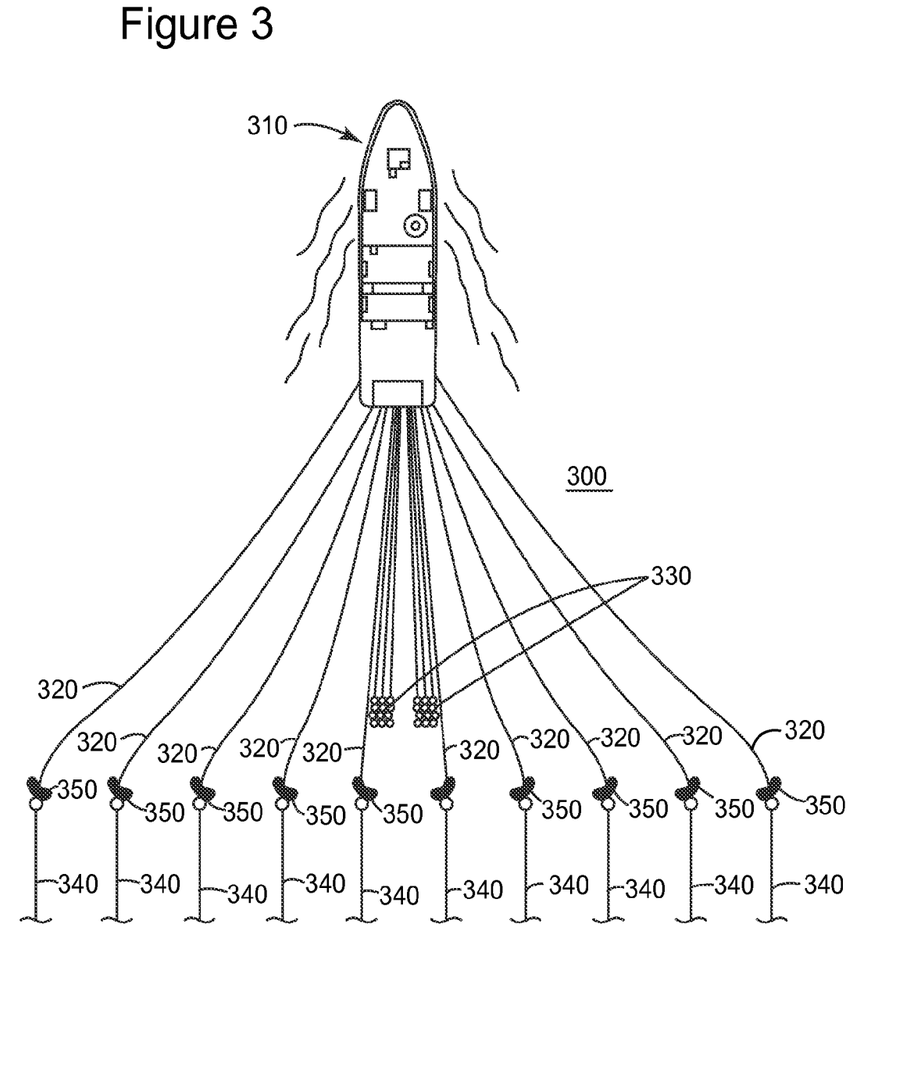
FIG. 3 is a schematic diagram of a marine data acquisition system according to an exemplary embodiment.

FIG. 3 is a schematic diagram of a marine data acquisition system 300 (bird's eye view) according to an exemplary embodiment. A vessel 310 tows plural lead-in cables. The lead-in cables 320 are configured to be deployed according to a predetermined geometry so that streamers 340 remain substantially parallel at predetermined distances there-between. Hydrophones or other receivers (not shown) along the streamers 340 record reflected seismic waves following a shot of a seismic source 330. One or more deflectors may be attached to the lead-in cables 320. FIG. 3 illustrates a deflector 350 attached to each of the lead-in cables 320. However, depending on size and placement of the deflector and presence of separation ropes tied between the cables, a deflector may have impact on plural streamers, i.e., fewer deflectors may be deployed. Alternatively, plural deflectors may be mounted along a single cable. The number of streamers illustrated in FIG. 3 is exemplary and not intended to be limiting.

Figure 4:
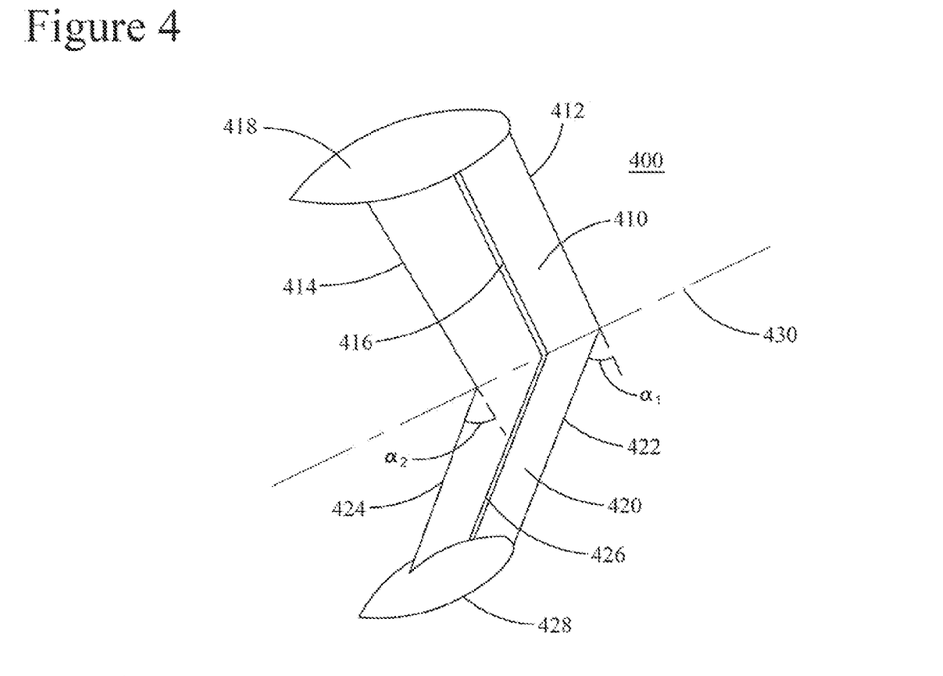
FIG. 4 is a deflector according to an exemplary embodiment.

A deflector 400 ("wide V-shape deflector") according to an exemplary embodiment is illustrated in FIG. 4. The deflector 400 has a wing body including a first part 410 joined to a second part 420 to form a swept-back-wing shape. The first part 410 and the second part 420 may be manufactured as a single piece. In one application, the first part is manufactured separately from the second part and it is attached to the second part by using known mechanisms, e.g., welding, gluing, bolts, etc. In one application, the first part 410 and the second part 420 are substantially flat and coplanar. The first and second part may be symmetrical relative to a joining axis 430.

A first straight line along a front edge 412 of the first part 410 makes a first angle $\alpha_1$ with a second straight line along a front edge 422 of the second part 420. In one application, the first angle $\alpha_1$ is a non-zero angle. A third straight line along a trailing edge 414 of the first part 410 makes a second angle $\alpha_2$ with a fourth straight line along a trailing edge 424 of the second part 420. In one application, the second angle $\alpha_2$ is a non-zero angle. The front edge is defined as the edge of the deflector (or wing) that is first along a moving direction (breaks the water) and the trailing edge is the last edge along the moving direction.

In one application, the first angle $\alpha_1$ and the second angle $\alpha_2$ may be substantially equal. The second angle $\alpha_2$ is preferably at least equal to the first angle $\alpha_1$. In another application, the first angle is between 10° and 30°, preferably between 15° and 25°.

The first part 410 may have a first slot 416 extending from an end where the first part 410 is joined to the second part 420 toward an opposite end of the first part 410. The second part 420 may also have a second slot 426 extending from an end where the second part is joined to the first part to an opposite end of the second part. The first slot 416 and the second slot 426 may also be symmetrical relative to the joining axis 430. The slots 416 and 426 allow water to pass through the first and second parts. This action improves the stability of the deflector, e.g., reduces stalling.

The deflector 400 may include a first ballast body (or "pod") 418 located at an end of the first part 410 opposite to the joining axis 430, and a second ballast body 428 located at an end of the second part 420 opposite to the joining axis 430. The first ballast body 418 and the second ballast body 428 may have a shape configured to have low fluid friction when the body moves substantially parallel to the joining axis. In one application, the first ballast body 418 is substantially lighter than the second ballast body 428. For example, the first ballast body 418 may weigh between 10% and 35% of the second ballast body 428. In one application, the deflector is neutrally buoyant and the ballast is about 40% of the deflector's weight. The deflector may be made of various materials, e.g., composite, plastic, metal, or a combination thereof.

Figure 5:
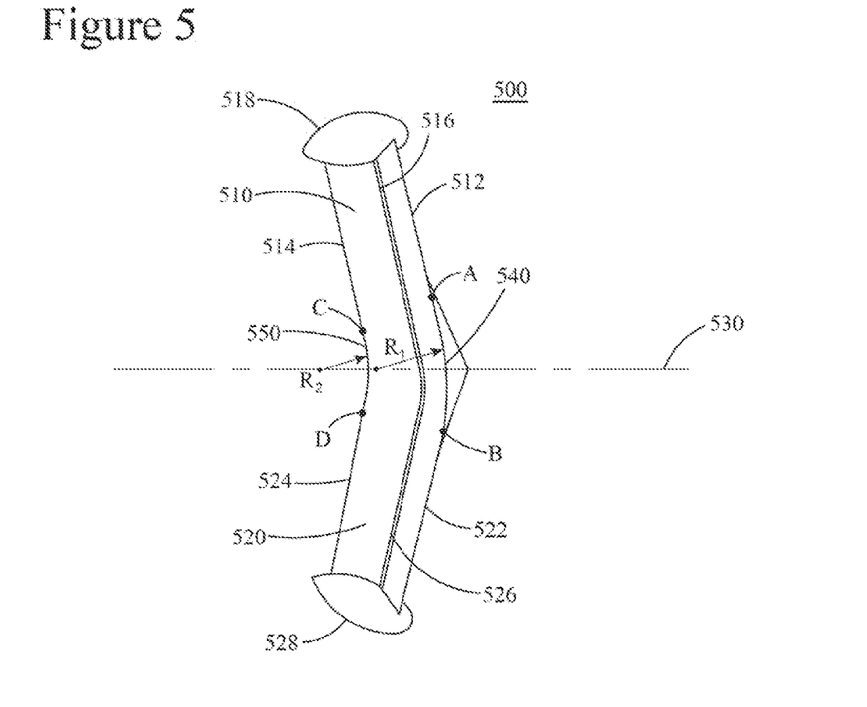
FIG. 5 is a deflector according to another exemplary embodiment.

A deflector 500 ("rounded wide V-shape deflector") according to another exemplary embodiment is illustrated in FIG. 5. The deflector 500 is similar to deflector 400, having a wing body including a first part 510 joined to a second part 520 to form a swept-back-wing shape. The first part 510 and the second part 520 are substantially flat and coplanar. The first and second part may be symmetrical relative to a joining axis 530. A first straight line extends along a part (i.e., from ballast body 518 to point A, for more than 50% of the length thereof to ensure stability) of a front edge 512 of the first part 510. A second line extends along a part (i.e., from ballast body 528 to point B, for more than 50% of the length thereof) of a front edge 522 of the second part 520. The first line makes a first angle $\alpha_1$ with the second straight line. The sides of the first angle $\alpha_1$ are the first and second straight lines. In this respect, it is noted that FIG. 5 shows the first straight line extending between ballast body 518 and point A and the second straight line extending between the ballast body 528 and point B. The leading edge of the reflector, between points A and B may be curved.

A third straight line extends along a part (i.e., from ballast body 518 to point C, for more than 50% of the length thereof) of a trailing edge 514 of the first part 510. A fourth straight line extends along a part (i.e., from ballast body 528 to point D, for more than 50% of the length thereof) of a trailing edge 524 of the second part 520. The third line makes a second angle $\alpha_2$ with the fourth line. The second angle $\alpha_2$ may be a non-zero angle. The first angle $\alpha_1$ and the second angle $\alpha_2$ have similar characteristics with angles $\alpha_1$ and $\alpha_2$ of deflector 400.

The first straight line and the second straight line of the deflector 500 may be connected via a first curved portion 540. The third straight line and the fourth straight line of the deflector 500 may be connected via a second curved portion 550. The first curved portion 540 may be an arc of a circle (i.e., a portion of the circle's circumference) having a first radius $R_1$ and the second curved portion 550 may be an arc of a circle having a second radius $R_2$. The second radius $R_2$ may be smaller than the first radius $R_1$. The first and second curved portions may be parameterized curves (i.e., curves described by a mathematical equation) different from a circle, e.g., a part of an ellipse, or parabola, etc.

The first part 510 may have a first slot 516 extending from an end where the first part is joined to the second part toward an opposite end of the first part. The second part 520 may also have a second slot 526 extending from an end where the second part is joined to the first part to an opposite end of the second part. The first slot 516 and the second slot 526 may also be symmetrical relative to the joining axis 530.

The deflector 500 may also include a first ballast body 518 located at an end of the first part 510 opposite to the joining axis 530, and a second ballast body 528 located at an end of the second part 520 opposite to the joining axis 530. The first ballast body 518 and the second ballast body 528 may have similar features as the ballast bodies 418 and 428.

The deflectors are made of materials compatible with service in both a marine environment and onboard (or in deployment or retrieval from) a vessel. For example, the deflectors may be made of metals and alloys such as duplex steel, stainless steel, aluminum, titanium, plastics, and composites such as fiberglass and carbon fibers.

Tests and simulations have compared angular stability of the conventional deflector and deflectors similar to the ones illustrated in FIGS. 4 and 5. It has been observed that the pitch and roll effects are strongly correlated.

Figure 6:
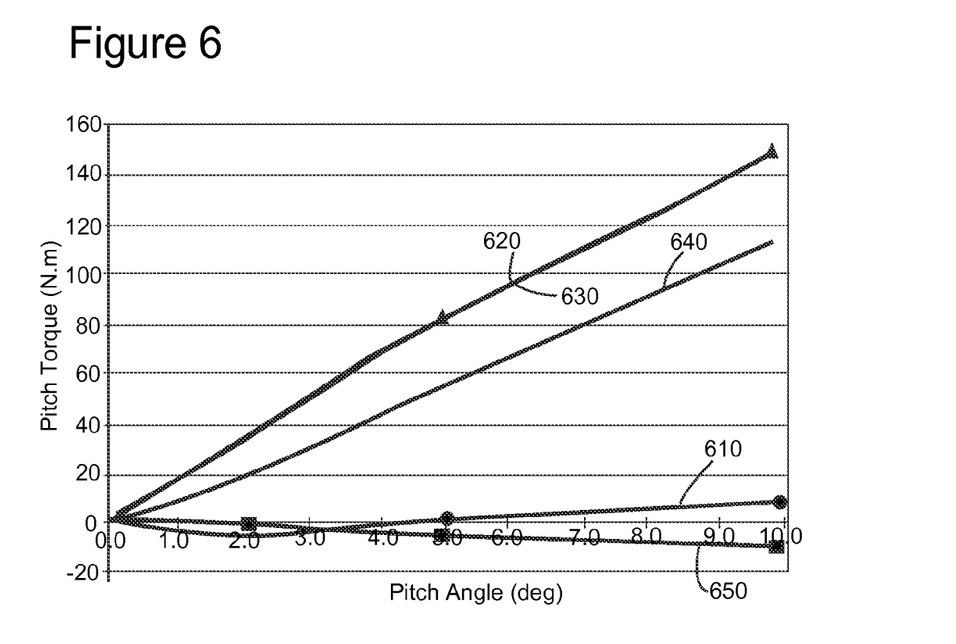
FIG. 6 is a graph illustrating pitch torque versus pitch angle for various deflectors including exemplary embodiments.

FIG. 6 is a graph illustrating a pitch torque versus a pitch angle of a deflector, line 610 therein corresponding to the conventional deflector, line 620 corresponding to a deflector similar to the embodiment illustrated in FIG. 4 ("wide V-shape") and line 630 corresponding to a deflector similar to the embodiment illustrated in FIG. 5 ("rounded wide V-shape"). Additionally, a deflector similar to the wide V-shape deflector but having $\alpha_2$ angle equal to zero ("V-full wing") and a deflector having a rectangular but twisted wing body (attack angle reduced at extremities) have been tested, the test results being illustrated as lines 640 and 650, respectively. Lines 620 and 630 overlap and show a substantially improved angular stability than the conventional deflector (line 610), because the wide V-shape deflector and the rounded wide V-shape deflector have a higher pitch torque returning the deflector to the intended position. It has been observed that this angular stability may be improved by increasing a ratio between the weights of the ballast bodies, up to 0.35.

Figure 7:
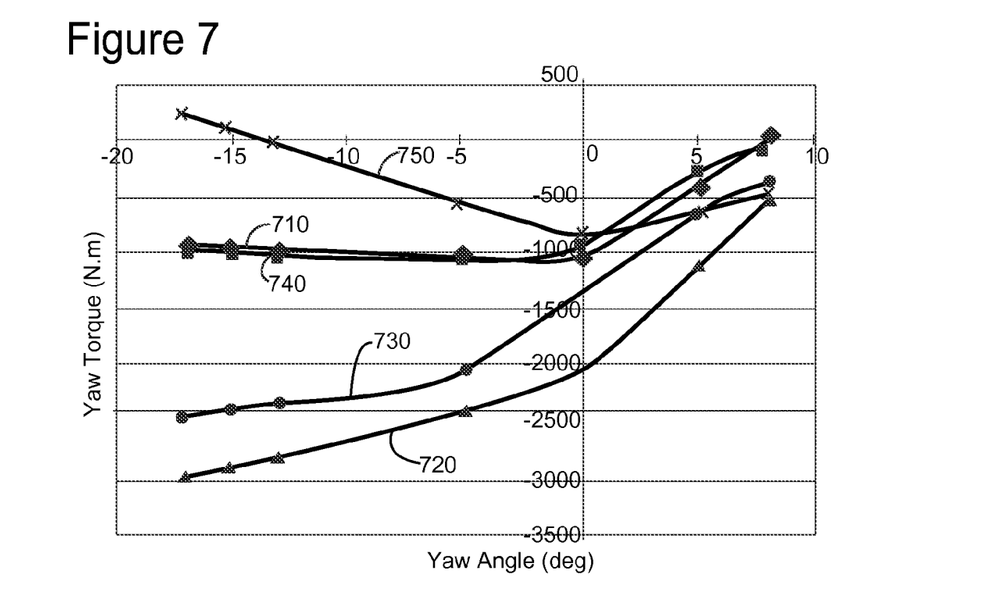
FIG. 7 is a graph illustrating yaw torque versus yaw angle for various deflectors including exemplary embodiments.

FIG. 7 is a graph illustrating a yaw torque versus a yaw angle of a deflector, line 710 therein corresponding to the conventional deflector, line 720 corresponding to a wide V-shape deflector (i.e., similar to the embodiment illustrated in FIG. 4) and line 730 corresponding to a wide rounded V-shape deflector (i.e., similar to the embodiment illustrated in FIG. 5). Lines 740 and 750 correspond to a V-full wing deflector and a twisted wing body deflector, respectively.

These tests and simulations have demonstrated that both the wide V-shape deflector and the rounded wide V-shape deflector have significantly superior angular stability compared to the conventional deflector. The wide V-shape deflector has best angular stability with a minor loss in performance (around 3% smaller lift force). However, the sharp angle in front of this type of deflector creates a stress concentration location and makes it more difficult to handle. Although the rounded wide V-shape deflector is slightly less stable regarding the yaw angle, this type of deflector does not have the stress concentration problem and it is easier to handle and to manufacture.

Figure 8:
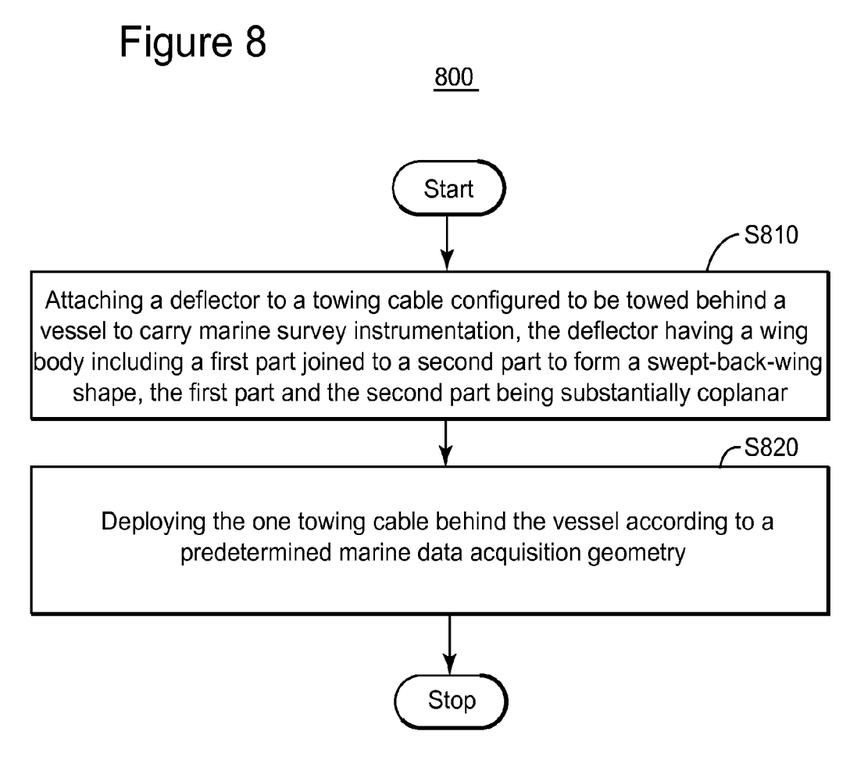
FIG. 8 is a flowchart of a method for towing a source array according to an exemplary embodiment.

A flow diagram of a method 800 of controlling a position of one or more components of a marine data acquisition system according to another exemplary embodiment is illustrated in FIG. 8. The method 800 includes attaching at least one deflector to at least one towing cable configured to be towed behind a vessel while carrying components of the marine data acquisition system, the deflector having a wing body including a first part joined to a second part to form a swept-back-wing shape, the first part and the second part being substantially coplanar, at S810. The method 800 further includes deploying the towing cable behind a vessel according to predetermined marine data acquisition geometry, at S820. The at least one deflector may be similar to any of the embodiments illustrated in FIGS. 4 and 5, wherein a first straight line along at least a portion of a front edge of the first part makes a first angle with a second straight line along at least a portion of a front edge of the second part, and a third straight line along at least a portion of a trailing edge of the first part makes a second angle with a fourth straight line along at least a portion of a trailing edge of the second part, the first angle and the second angle being non-zero angles.

One or more of the exemplary embodiments discussed above are related to deflectors attached to a towing cable of a vessel towing a marine data acquisition system. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A deflector configured to be attached to a cable towed by a vessel and configured to connect to a streamer or a source for a marine survey, the deflector comprising:
 a wing body including a first part joined at a joining axis to a second part to form a swept-back-wing shape, the first part and the second part being substantially coplanar and maintaining a substantially vertical orientation when towed,
 wherein
  a first straight line stretching along at least a portion of a front edge of the first part makes a first angle with a second straight line stretching along at least a portion of a front edge of the second part,
  a third straight line stretching along at least a portion of a trailing edge of the first part makes a second angle with a fourth straight line stretching along at least a portion of a trailing edge of the second part, the first angle and the second angle being non-zero angles, a first slot extends from the joining axis along the first part, and a second slot is connected to the first slot and extends from the joining axis along the second part, an angle between the first slot and the second slot enabling the first and second slots to remain at distances from the front edge of the first part and the front edge of the second part, respectively.

2. The deflector of claim 1, wherein the first angle and the second angle are substantially equal.

3. The deflector of claim 1, wherein the portion of the front edge of the first part along which the first straight line stretches is longer than half of the front edge of the first part, the portion of the front edge of the second part along which the second straight line stretches is longer than half of the front edge of the second part, the portion of the trailing edge of the first part along which the third straight line stretches is longer than half of the trailing edge of the first part, and the portion of the trailing edge of the second part along which the fourth straight line stretches is longer than half of the trailing edge of the second part.

4. The deflector of claim 1, wherein the portion of the front edge of the first part along which the first straight line stretches and the portion of the front edge of the second part along which the second straight line stretches are connected via a first curved portion, and the portion of the trailing edge of the first part along which the third straight line stretches and the portion of the trailing edge of the second part along which the fourth straight line stretches are connected via a second curved portion.

5. The deflector of claim 4, wherein the first curved portion is an arc of a circle having a first radius and the second curved portion is an arc of a circle having a second radius.

6. The deflector of claim 5, wherein the second radius is smaller than the first radius.

7. The deflector of claim 1, wherein the first angle is between 15° and 25°.

8. The deflector of claim 1, wherein the portion of the front edge of the first part, the portion of the front edge of the second part, the portion of the trailing edge of the first part, and the portion of the trailing edge of the second part, along which the first line, the second line, the third line and the fourth line respectively stretch, extend at least 10% of a length of the first part or of the second part, respectively.

9. The deflector of claim 1, wherein the deflector is neutrally buoyant.

10. The deflector of claim 1, further comprising:

a first ballast body located at an end of the first part opposite to the joining axis; and a second ballast body located at an end of the second part opposite to the joining axis, wherein the first ballast body and the second ballast body have a shape configured to have low fluid friction when the body moves substantially parallel to the joining axis, and the first ballast body is lighter than the second ballast body.

11. A marine data acquisition system, comprising:

towing cables configured to be deployed according to a predetermined geometry behind a towing vessel and configured to connect to a streamer or a source;

at least one deflector attached to one of the towing cables, the at least one deflector having a wing body including a first part joined at a joining axis to a second part to form a swept-back-wing shape, the first part and the second part being substantially coplanar and maintaining a substantially vertical orientation when towed, wherein a first straight line stretching along at least a portion of a front edge of the first part makes a first angle with a second straight line stretching along at least a portion of a front edge of the second part, a third straight line stretching along at least a portion of a trailing edge of the first part makes a second angle with a fourth straight line stretching along at least a portion of a trailing edge of the second part, the first angle and the second angle being non-zero angles, and a first slot extends from the joining axis along the first part, and a second slot is connected to the first slot and extends from the joining axis along the second part, an angle between the first slot and the second slot enabling the first and second slots to remain at distances from the front edge of the first part and the front edge of the second part, respectively.

12. The marine data acquisition system of claim 11, wherein the first angle and the second angle are substantially equal.

13. The marine data acquisition system of claim 11, wherein the portion of the front edge of the first part along which the first straight line stretches and the portion of the front edge of the second part along which the second straight line stretches are connected via a first curved portion, and the portion of the trailing edge of the first part along which the third straight line stretches and the portion of the trailing edge of the second part along which the fourth straight line stretches are connected via a second curved portion.

14. The marine data acquisition system of claim 13, wherein the first curved portion is an arc of a circle having a first radius and the second curved portion is an arc of a circle having a second radius.

15. The marine data acquisition system of claim 14, wherein the second radius is smaller than the first radius.

16. The marine data acquisition system of claim 11, wherein the first angle is between 15° and 25°.

17. The marine data acquisition system of claim 11, wherein the deflector further comprises:

a first ballast body located at an end of the first part opposite to the joining axis; and a second ballast body located at an end of the second part opposite to the joining axis, wherein the first ballast body and the second ballast body have a shape configured to have low fluid friction when the body moves substantially parallel to the joining axis, and the first ballast body is lighter than the second ballast body.

18. A method of controlling position of one or more components of a marine data acquisition system, the method comprising:

attaching a deflector to a towing cable configured to be towed behind a vessel, the deflector having a wing body including a first part joined at a joining axis to a second part to form a swept-back-wing shape, the first part and the second part being substantially coplanar and maintaining a substantially vertical orientation when towed; and deploying the towing cable behind the vessel according to a predetermined marine data acquisition geometry, wherein a first straight line stretching along at least a portion of a front edge of the first part makes a first angle with a second straight line stretching along at least a portion of a front edge of the second part, a third straight line stretching along at least a portion of a trailing edge of the first part makes a second angle with a fourth straight line stretching along at least a portion of a trailing edge of the second part, the first angle and the second angle being non-zero angles, and a first slot extends from the joining axis along the first part, and a second slot is connected to the first slot and extends from the joining axis along the second part, an angle between the first slot and the second slot enabling the first and second slots to remain at distances from the front edge of the first part and the front edge of the second part, respectively.

19. The method of claim 18, wherein the deflector further comprises:

a first ballast body located at an end of the first part opposite to the joining axis; and a second ballast body located at an end of the second part opposite to the joining axis, wherein the first ballast body and the second ballast body have a shape configured to have low fluid friction when the body moves substantially parallel to the joining axis, and the first ballast body is lighter than the second ballast body.

* * * * *